Aug. 28, 1934.  J. H. DAVIS  1,972,050
HIGH FREQUENCY METHOD OF AND APPARATUS FOR EXTERMINATING
INSECT LIFE IN SEED OR GRAIN OR OTHER MATERIALS
Filed Aug. 8, 1932  3 Sheets-Sheet 1

Inventor
Jesse H. Davis

By
[signature]
Attorney

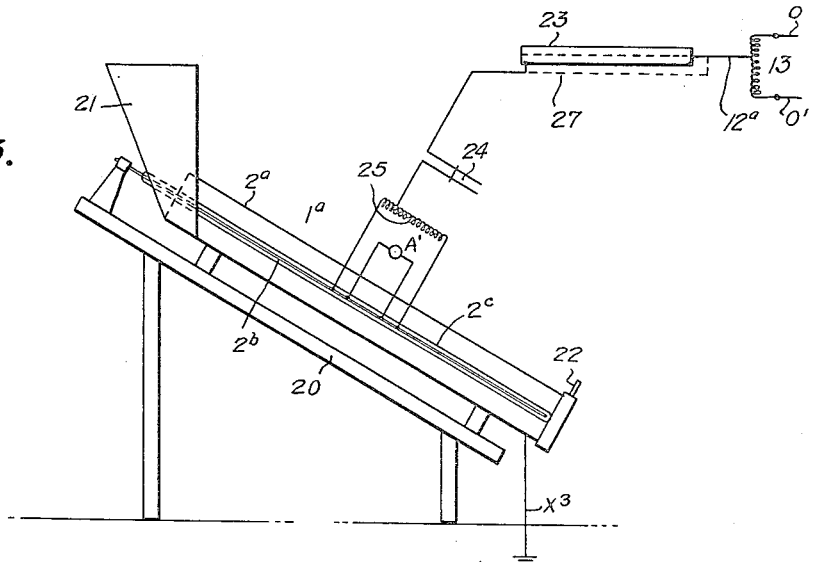
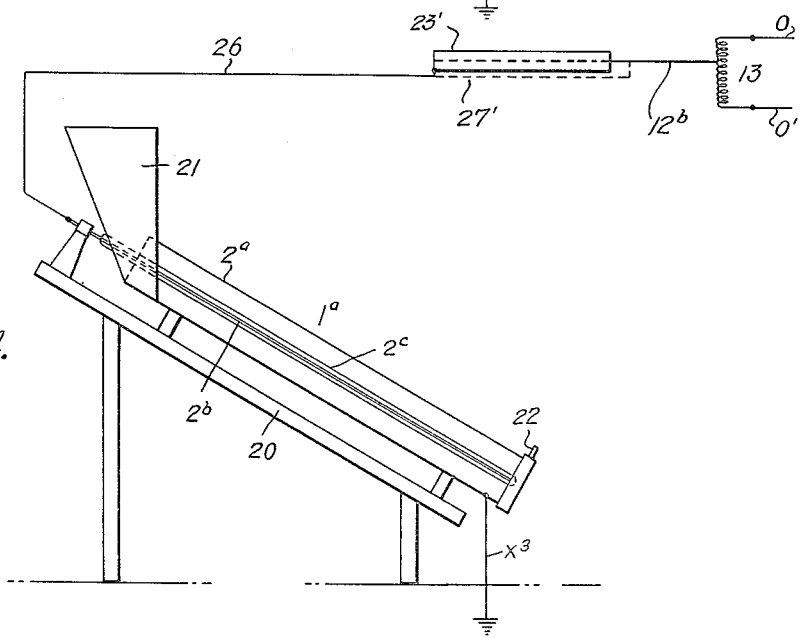

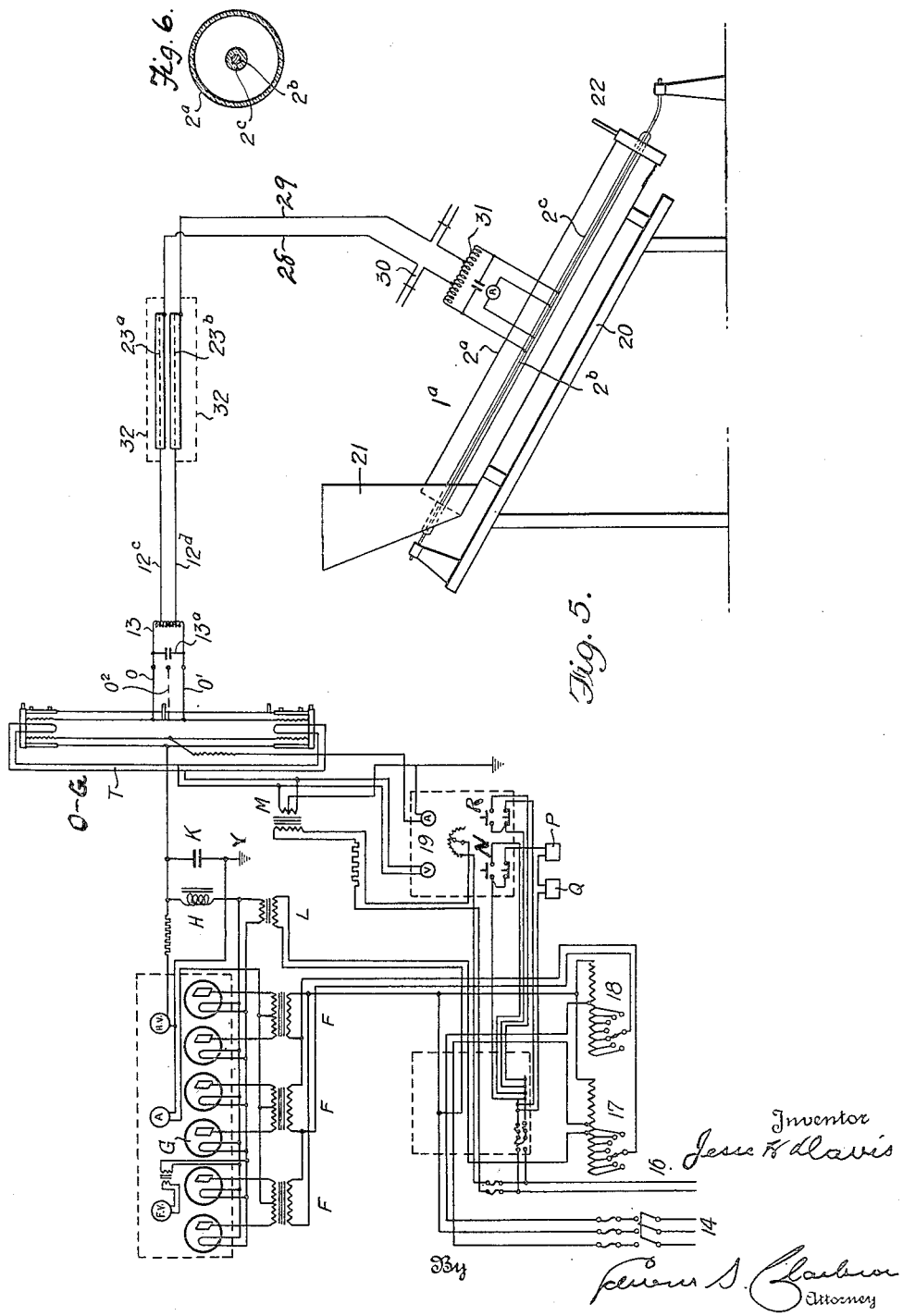

Patented Aug. 28, 1934

1,972,050

UNITED STATES PATENT OFFICE 1,972,050

HIGH FREQUENCY METHOD OF AND APPARATUS FOR EXTERMINATING INSECT LIFE IN SEED OR GRAIN OR OTHER MATERIALS

Jesse H. Davis, Baltimore, Md.

Application August 8, 1932, Serial No. 627,953

28 Claims. (Cl. 175—311)

This invention relates to a high frequency method of and apparatus for exterminating insect life in seed or grain or other materials, such as the extermination of grain weevil, moths, and other like injurious insects, and their larvæ and pupa, which prey upon vegetable seed of various kinds and upon wheat and other stored grain or other materials.

In my prior applications Serial No. 580,170, filed December 10, 1931, and Serial Nos. 608,311 and 608,312, filed April 29, 1932, I have disclosed and claimed methods of and apparatus for destroying insects in grain, etc., by the action of high frequency oscillations. The present application dicloses an improved method and certain improvements in the types of apparatus disclosed in the aforesaid applications for carrying the invention into practical effect.

One object of my invention is to provide a method of and apparatus for producing high frequency oscillations and subjecting the material in bulk to the action thereof in a destructive field in which the exterminator or treater and the material contained therein for treatment are tuned to respond to the highest degree to the impressed frequency so as to effect the rapid destruction of the insects.

Another object of the present invention is to provide novel means for connecting the output side of the high frequency oscillation generator with the exterminator, whereby the latter may be constructed and placed without regard to the particular placing of the oscillator.

Still another object of the invention is to provide different transmission connections between the oscillator and exterminator to suit different conditions of use or as may be best suited for action of the exterminator.

Still another object of the invention is to provide a general construction of oscillator and exterminator furnishing an exterminating apparatus of simple and economical character, but of high efficiency.

Still another object of the invention is to provide a construction of apparatus in which the time period of exposure of the grain being treated to the effect of the high frequency oscillations may be varied, and in which the apparatus may be tuned to adjust the impedance of the transmission line to the capacity of the field and its contents to secure the strongest field effect.

Still another object of my invention is to provide for the rapid destruction of insects in infested grain by the dual heating action of physical heat and high frequency electrical oscillations, whereby destruction of all insect life will be expedited and the grain simultaneously relieved of excessive moisture.

With these and other objects in view, the invention consists of the novel features of construction, combination and arrangement of parts hereinafter more fully described and claimed, reference being had to the accompanying drawings, in which:—

Figs. 3 and 4 are views showing different ways of connecting a tube type exterminator to the high frequency oscillation generator.

Fig. 5 is a view showing still another way of connecting a tube type exterminator to the high frequency oscillation generator.

Fig. 6 is a transverse section through a tube type generator such as illustrated in Figs. 3, 4 and 5.

Figure 1:
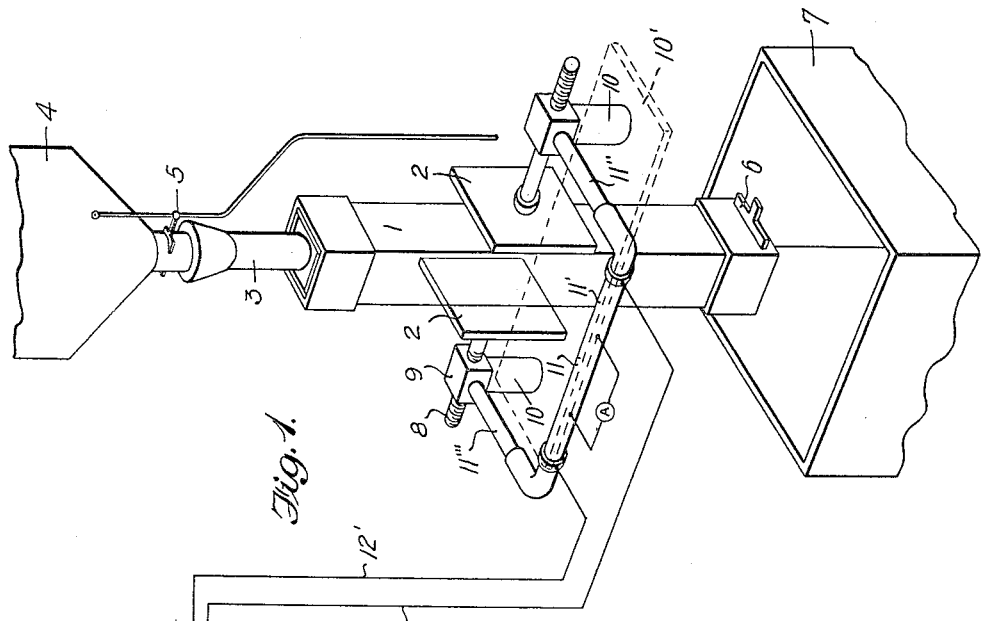
Fig. 1 is a diagrammatic view, partly in perspective, showing one form of high frequency oscillation generator and a box type of exterminator employing platen electrodes embodying my invention.

Referring now more particularly to Fig. 1 of the drawings wherein I have shown a treater or exterminator of box type comprising a casing, chute or conductor for the bulk reception of the grain which is to be treated, associated with space field electrodes, in the field of which the casing or conductor is arranged, 1 designates an elongated casing or conductor which is shown as of rectangular cross-section, preferably of parallelepipedon shape, as shown, and made of glass and which is disposed in the space charge electrostatic field defined by and between a pair of platen electrodes 2, made of metal of suitable kind and dimensions. The treater receives the grain through a spout 3 from an overhead bin 4. The flow of grain from this bin 4 is controlled by a valve 5 and a valve 6 controls the discharge of the grain from the treater into a suitable receptacle 7. The treater 1 preferably is arranged for the gravity flow of the grain therethrough, for reasons hereinafter set forth, and the rate of flow of the grain may be governed by adjustment of the valves and/or by properly dimensioning the treater and disposing it to regulate the gravity flow action. By this means, and/or by proper adjustment of the platen electrodes 2, the time period of action and effect of the high frequency oscillations on the grain or moving material may be regulated controlled to an exact degree during the movement of the grain or material while within and between the confines of the vertical dimensions of the electrodes 2.

Figure 2:
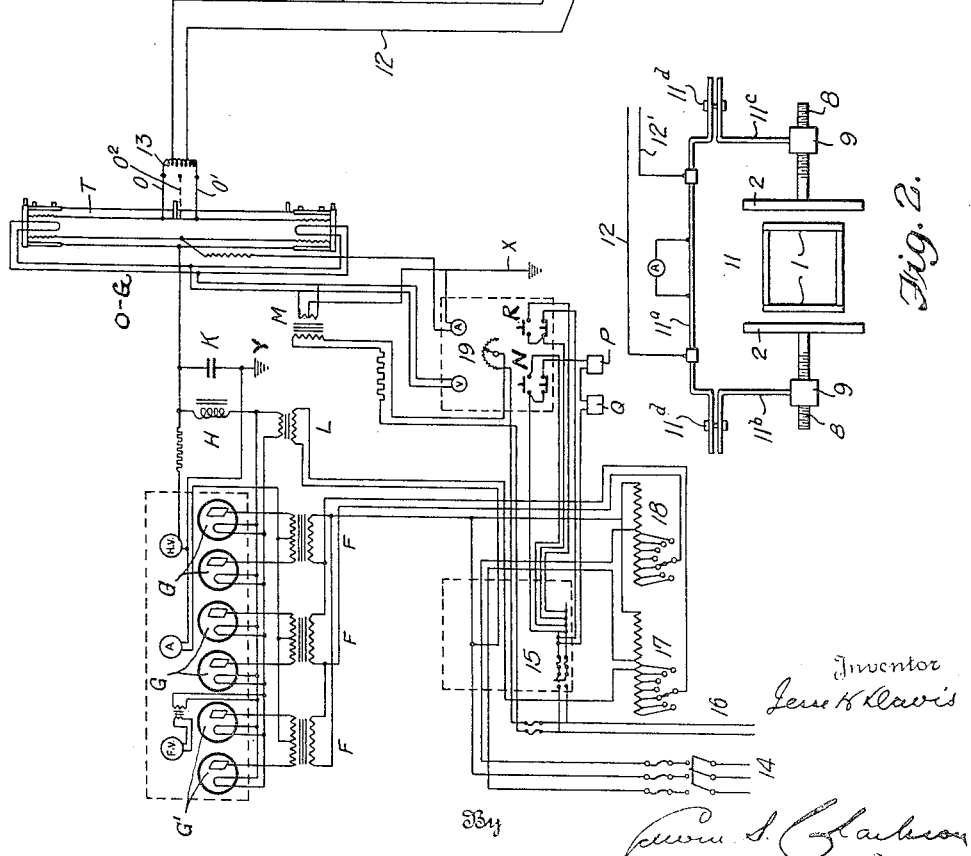
Fig. 2 is a diagrammatic plan view of the exterminator showing a slightly modified form of the tuning coil.

The platen electrodes 2 are horizontally adjustable toward and from each other, and toward and from the adjacent sides of the treater 1, to vary the width of the electrostatic field, by means of screw shafts 8 by which they are carried. These shafts are rotatably supported by metal pillow blocks 9 which are in turn supported on insulations 10 mounted in practice on a shelf or other support 10'. Associated with the platen electrodes is a trombone type of tuning coil 11 composed of members 11', 11'', 11''', preferably formed of copper tubing, which may be adjusted as to length by sliding movement of member 11' on members 11'' and 11''' to balance the impedance of the coil and transmission line conductors 12, 12' from the high frequency oscillation generator O—G against the condenser capacity of the platen electrodes. When the proper balance is obtained to secure the strongest field effect, i. e., when the treater and its contents are tuned to respond to the highest degree to the impressed frequency furnished by the oscillating equipment, ammeter A shows maximum current in amperes. Fig. 2 shows a slight modification of the treater structure in which the tuning coil is formed of bar members 11a, 11b and 11c instead of tube members, the bar member 11a being adjustably connected with the bar members 11b and 11c by screws or other suitable adjusting devices 11d.

The oscillation generator O—G consists of a water cooled oscillation vacuum tube T with which is associated an output or loading coil 13 from which extend the transmission line conductors 12, 12' coupling the high frequency power side of the oscillation generator with the exterminator. At 14 in this high frequency generator three phase 60 cycle 440 volt (or any commercial frequency) supply enters through suitable switch and fuses, from which the current passes to control panel 15 provided with the necessary switches, overload relays, contactors, etc., for controlling the flow of electric energy to the various working elements, a showing in detail of which switches, etc., has been omitted, as unessential to the disclosure, while single phase 220 volt, 60 cycle power for control and filament purposes enters at point 16. Auto transformers 17 and 18 are provided for varying the potential applied to the rectifying filament transformers F. These transformers step the voltage up where it is applied to the plates of the rectifier tubes G. In these rectifier tubes G high potential unidirectional (direct) current is produced which flows through choke coil H to condenser K and to oscillator tube T. The filaments of rectifier tubes G are heated by means of current supplied from transformer L, while the filaments at each end of vacuum tube T are heated by current furnished from transformer M. In starting the apparatus the main switch at 14 is closed, after which push button switch N is closed, which automatically opens the air interlock P and water interlock Q controlling the supply of cooling air and water for oscillator tube T and the supply of water for rectifier tubes G. Finally, the closing of push button switch R places the apparatus in operation. The drawings show on panel 19 the usual voltmeters and ammeters for measuring the electric energy, as well as certain necessary ground connections, as indicated at X and Y. This type of oscillator has high capacity, approximately 20 kilowatts, and is built for high frequencies, in the order of fifty million or more per second, but any suitable type of high frequency oscillator for producing the desired high frequency or range of high frequencies may be used, and in practice provision may be made for varying the frequency of the oscillators from, say, ten million to fifty million or more cycles per second, for supplying the proper frequency according to the electrical conductivity and other requirements of the material or substance and particular kind of insect under treatment.

The tube T is provided with output terminals o, o' to which coil 13 is connected and with a ground terminal $o^2$ which may be employed under some conditions. The structures disclosed in Figs. 1 and 2 show the use of two-conductor transmission line between the coils 13 and 11, which is preferred, but, by proper modifications, a single transmission line conductor may be employed. The formation of the treater 1 of glass of suitable thickness for use in conjunction with platen electrodes gives highly satisfactory results, because of the high heat reaction of glass to high frequency waves of the character referred to, although the treater may be made of materials other than glass and effective results secured, provided that a treater or shield of equivalent high heat reaction and shielding effect, as hereinafter described, is employed. By providing for the tuning of the input connections to the platen electrodes the system of connections may be tuned to give the strongest field effect suited to destroy the insect under treatment, as hereinafter more fully set forth.

Figs. 3, 4 and 5 show the application of the invention to a tubular type of treater or exterminator 1a, the same comprising concentric electrodes in the form of an outer metallic tube or pipe 2a and an inner metallic tube or pipe or rod 2b, as shown in my aforesaid application Serial No. 608,312, the inner electrode 2b being in this particular instance disclosed in the form of a rod provided with a glass sheathing or covering 2c. These electrodes may be of any suitable length and mounted in an inclined position on a frame support 20 for the gravity flow of the grain from a hopper 21 through the curved (circular) channel or electrostatic field space in tube 2a formed between the same and the tube or rod 2b. The flow of this grain may be controlled by a valve 22, so that the time period of exposure of the grain to the high frequency oscillations in the field space may be regulated. Fig. 3 shows a single line transmission from the oscillator to the center of the tubular exterminator, the conductor wire 12a extending from the output coil 13 through an inductive coupling 23 to a tuning coil 24 and thence through a loading or output coupling coil 25 to the exterminator. The tuner 24 here acts similar to the trombone type of tuner shown in Figs. 1 and 2, and an ammeter A' may be provided to indicate when the output circuit is tuned to give greatest efficiency. In Fig. 4 a single line transmission from the oscillator to the exterminator is employed in which the line 12b is connected through an inductive coupling 23' with the inner electrode 2b of the exterminator. In Figs. 3 and 4 the outer electrode tube 2a is properly connected to ground at $x^3$, and, as shown in each figure, the inductive coupling 23 or 23' may be omitted and a continuous conducting connection, as shown at 27, employed. Fig. 5 shows a two-wire transmission line in which conductors 12c and 12d are connected through inductive couplings 23a and 23b with conductors 28 and 29 connected through a tuner 30 and coupling coil 31 with the center of the tubular exterminator. The couplings 23a and 23b may, however, be dispensed with and continuous conductive connections substituted, as indicated at 32. A condenser 13a may be connected across coil 13. These various types of connections and others suitable for the purpose may be employed as desired and to suit special conditions, and as falling within the spirit and scope of the invention. In practice in the use of a double wire transmission the transmission wires may be connected to the tube terminals o, o', while in the use of a single transmission wire as applied to a tube type of exterminator such wire may be connected to either tube terminal o or o' and the ground line $x^3$ from the outer tube of the exterminator connected to ground through the tube terminal $o^2$.

The high frequency generator employed, as will be evident, is one adapted for producing short or ultra-short waves. By short waves is meant those of a band range between 10 meters (about 30,000 kilocycles or 30,000,000 cycles) to 30 meters (about 10,000 kilocycles or 10,000,000 cycles) or more, and by ultra-short waves are meant waves of a band between 10 meters and 6 meters (about 50,000 kilocycles or 50,000,000 cycles) and in some cases as low as 3 meters (about 100,000 kilocycles or 100,000,000 cycles). In general the wave length ranges of from 6 to 30 meters, or frequency ranges of from 50,000 kilocycles to 10,000 kilocycles, will be found sufficient, though frequencies within the maximum and minimum ranges given may be employed. I have found that in treating grain with my apparatus in a thin sheet with frequencies in the order of 55,000,000 and above, weevil and all other insect life in or on the grain will succumb within one to three seconds.

Extensive study and laboratory and practical working tests made by me show that by producing high frequency oscillations of the order of ten million to fifty million, or possibly in some cases one hundred million cycles per second, and exposing the infested material to be treated to such oscillations, an action will be produced through the effect of eddy currents being induced in the adult insects, eggs, larvæ, or pupa sufficient to elevate the temperature of such insects and their progeny to the point where they will succumb to the induced heat. Where the electrical conductivity of the infested material treated is less than that of the insects to be destroyed the temperature induced in the treated part of the material will be lower than that induced in the insects. The effect of the induced eddy currents of the frequencies employed is to develop by induction in the insects, eggs, larvæ or pupa, a temperature of from 110° to 150° F., the most effective temperatures being from 120° to 140° F., at which temperatures the insects, their eggs, larvæ or pupa are destroyed without inducing such a high temperature in the grain, or a sufficiently high temperature to effect the germinating properties of the grain, which will remain unaffected for the short period to which it is exposed during treatment. In practice I have found that in the treatment action the insects are destroyed by the dual effects of heat, which reduces their vitality or resistance to destruction, and to some specific action on the nervous system or vital organs of the insects caused by the electrical oscillations, under which, owing to their weakened condition due to the heat action, they quickly succumb. These effects are produced by the peculiar character of the waves, whatever they may be, electrostatic and/or electromagnetic, or of other character, generated by space discharge action in a high frequency field. My studies and investigations have also indicated that resonance, and probably invisible light rays, also assists in elevating the temperature of the insect as well as the induced eddy currents. Resonation undoubtedly tends to temperature elevation or other devitalizing effects which is additive to the temperature elevation brought about by the induced eddy currents. The period of treatment for destroying insect life in grain varies to certain degrees dependent upon the electrical conductivity of the grain and insects and the frequency used, but ordinarily ranges from two to three seconds for very high frequencies, 50,000 kilocycles and above to one or two minutes for lower frequencies, i. e., 10,000 kilocycles, during which period of time all insect life is destroyed. This period is insufficient to cause an injury to the grain by the developed temperatures.

The time period of treatment may be regulated, in a generator operating normally at a rated frequency, or within certain frequency ranges, by adjusting the platen electrodes in the type of apparatus shown in Figs. 1 and 2 relative to each other to vary the voltage across the space or gap, the adjustment of the platens toward each other enabling the voltage to be doubled under some conditions to reduce the time period of treatment so that the voltage may be increased proportionately to increases of resistance in the electrical conductivity of the grain and insects or double the amount of grain treated in the same period of time with the same expenditure of initial energy. The action of the oscillations of a predetermined general working frequency for any certain kind of grain and insects may be further increased by tuning the oscillations to "maximum destructive frequency" suited for the particular material and insects under treatment. This micrometric method of oscillations normally roughly tuned to destructive frequency and tuning them as propagated to a particular or maximum destructive frequency, suited to conditions, is an important feature of my invention.

As stated, the treater or receptable 1 in the form shown in Fig. 1 is preferably made of glass, this material having a high heating reaction to high frequency oscillations of the character employed, and thus having a pronounced effect in favoring and promoting the speed of development of internal lethal heat in the insects, and the rapidity of destruction of the insects without injurious action on the grain or carrier material. This is due to the fact that the rise in temperature produced in the insects by the effects of the eddy currents is supplemented to a large extent by the radiant heat produced in the glass receptacle. In other words, the insects, when thus treated, are subjected to the dual action of being heated from within and without, thus bringing about a quick rise of temperature to the lethal point. During this treatment the grains of wheat are also exposed to the radiant heat from the glass, but the grain being a very poor heat conductor does not respond to temperature elevation as rapidly or to the same degree as the insects or to such a degree as to be heated to an injurious extent during the time period of treatment. The grain, therefore, will be kept comparatively cool while the insects succumb to treatment, because the insects develop a lethal temperature considerably above that developed in the carrier material. The foregoing action is quite analogous to that occurring with light waves and heat waves emanating from the sun. The light rays are invisible and likewise the heat waves are ineffective until they reach the relatively dense atmosphere of the earth. In the case of light waves, they must be reflected before they are visible. In the case of heat waves they are manifested on encountering our dense atmosphere. So it is with the high frequency oscillation waves transmitted through the glass receptacle. This medium which is denser than the atmosphere absorbs much energy as the high frequency oscillation waves pass through it which is immediately reflected in a rise of temperature because the energy so absorbed has its exact equivalent in heat. It is quite possible that by the use of ordinary glass, certain wave lengths are completely absorbed, as in the case of ultra violet rays which pass through quartz but are absorbed by ordinary glass. Another advantage incident to the use of glass is that while absorbing rays to which it has heat reaction, it permits light rays to pass through it with but little diminution, which appears to be of some importance in that, in addition to resonance and developed lethal heat, invisible light or other rays have some effect in causing a rapid destruction of the insects, as well as some influence producing neutralization or amplification of the natural electrical potential with which the protoplasm is endowed and upon the maintenance of which life depends. The presence of moisture in the grain also assists in increasing conductance and in a field of high frequency oscillations, in developing temperature rise in the insects, while at the same time operating by evaporation, in the event of freedom of escape of the generated vapor, to assist in keeping the grain cool. The use of a glass treater or shield, furthermore, is advantageous, especially in connection with a gravity feed action, in that the production and effects of conduction currents, as well as undesirable capacity effects, such as are liable to occur in the presence of additional mechanical agencies, are avoided, so that the frequency and voltage may be kept under steady control. By placing the glass treater 1 between electrodes 2 which are adjustable to regulate the width of the electromagnetic or electrostatic field in which the treater is arranged, provision is made, in addition to the advantages above stated, for increasing the field strength in compliance with Coulomb's law that "the force of attraction or repulsion between two charges of electricity concentrated at two points in an isotropic medium is proportional to the product of their magnitudes and is inversely proportional to the square of the distance between them". My experiments have shown that decreasing the distance between the electrodes within certain ranges increases the field strength per linear inch and allows passage of the infested material through the electrostatic or electromagnetic treatment field at a higher velocity than would otherwise be possible while maintaining its destructive effect on insect life.

In the concentric electrode form of tube type generator shown in Figs. 3, 4 and 5, the grain is protected from injurious electrical charges by providing the inner electrode or electrodes with glass coverings or shields, which at the same time through their heat reaction effect promote the development of lethal heat in the insects. The use of a treater of this type is of advantage in enabling the grain to be disposed in a stream of circular or partly circular form of small cross-section, or of the grain being disposed between electrodes in such manner as to physically expose the same more favorably and effectively to the action of the high frequency electrical oscillations. Another advantage of the use of the concentric tube type of heater is that it produces a very intense and uniform electrostatic or electromagnetic field through which the infested material is treated. In carrying out the operation with this type of apparatus, a standing wave oscillator may be employed and the treater tube and oscillator may be in main respects of substantially the same construction, the oscillator being formed, like the treater, of an outer copper tube of about 6" in diameter which forms the plate of the tube connected to a three-element oscillator at each end, the oscillator having also like the treater an inner tube or electrode also made of copper and connected as the grid to the grid elements of the three-element vacuum tubes at each end of the oscillator, the treater circuit being connected through a load coil to the grid only of the oscillator on each side of the center grid, which is grounded. By employing a tubular concentric treater and balancing the impedance or inductance of the transmission line against the capacitance of the two concentric tubes, and making these tubes of proper length, a most highly efficient way of employing the generator oscillation energy is obtained. It is of extreme importance that the length of the treater so made and its electrical capacitance be such that the standing wave oscillation put out by the generator will be most effectively used in the material under treatment. As the length of the concentric tubular treater so coupled to the oscillation generator combined with the inductance of the transmission line is a function of the wave length of the oscillator, power losses are prevented and a highly intense field obtained.

The apparatus embodying my invention, as herein set forth, may be employed for the treatment of infested grains or cereals in elevators, graineries, warehouses and other containers for the treatment of grain while the grain is being loaded or unloaded or transferred from point to point in the elevator or other storage place, and particularly in the transit of grain from a delivery vehicle to the elevator for storage, so that the grain may be treated at the time best adapted for the purpose as well as to enable the operation to be easily, quickly and conveniently carried out, without the necessity of re-handling the grain for the purpose. The apparatus may, of course, be either in the form of permanent or temporary installations at the elevators, graineries or other plants where it is to be used, it may be of portable type so as to be used in any portion of an elevator or storage plant, and the grain conveying systems of graineries, elevators or other like grain containers may be easily modified in construction to include the exterminator so that either fixed or portable generators may be used in connection therewith for carrying out the treatment. A great advantage of this apparatus and method of treatment, besides that of economy of operation, is that it is inexpensive in construction and may therefore be supplied and installed at a comparatively low cost, is rapid in its action, allowing a large amount of material to be treated within a given time, and under all proper conditions it has no deleterious effect whatever upon the grain treated, the character and time period of treatment being such as to avoid any appreciable drying out or other deleterious effect on the grain.

This method and apparatus may be used for the treatment of seed or seed grain to be planted, for the purpose of destroying any adult insects or their eggs which may be upon the surface or deposited within the seed. Great losses are sustained by seed merchants on account of the necessity of discarding seed infested with insects developed from eggs deposited within the seed. It has been the practice of such merchants to use different kinds of chemicals which they place in the bins containing the seed for the purpose of killing the adult insects which may be contained therein, but the destruction of these insects very often occurs after they have consumed the interior of the seed to such an extent that it will not germinate and grow. By treating the seed in accordance with my invention, the adult insects and their eggs may not only be destroyed, but losses prevented by the depredations commonly committed by insects hatching from the eggs, which can not be destroyed by the chemicals generally employed. Seed treated according to my process will not, if properly protected, later on become infested with insects and it has been found that grain or seed so treated, if not overexposed, will germinate faster and grow with greater rapidity than grain or seed not so treated, if planted within a reasonable time following exposure to the high frequency oscillations, and the growth will be more prolific and the yield greater or of superior quality.

What I claim is:—

1. The method of destroying insects in insect infested material, which consists in disposing the insect infested material in an electrostatic field, generating high frequency oscillations of suitable frequency to develop lethal heat in the insects and passing the same through said field, and tuning the material and insects to respond reactively to the impressed frequency supplied by the generator.

2. The method of destroying insects in insect infested material, which consists in disposing the insect infested material in an electrostatic field defined by spaced emission electrodes arranged in the transmission circuit of a high frequency oscillation generator, generating high frequency electrical oscillations by the action of said generator of a frequency to develop lethal heat in the insects and passing the same through said field, and adjusting the impedance of the transmission circuit to the capacity of said field so as to tune the material and insects to respond reactively to the impressed electrical oscillations.

3. In an apparatus for destroying insects in insect infested material, a high frequency electric oscillation generator including spaced electrodes forming an electrostatic field, and a transmission line connecting the generator with the electrodes, a container disposed in said field for receiving the material to be treated, and means for adjusting the impedance of the transmission line to the capacity of the field so as to tune the container and its contents to respond reactively to the impressed frequency furnished by the generator.

4. The method of destroying insects in insect infested material by means of high frequency electrical oscillations, which consists in disposing the insect infested material in an electrostatic field, generating high frequency electrical oscillations of suitable frequency to develop lethal heat in the insects and passing the same through said field, interposing in the field between the field terminals and infested material a shield having high heat-reaction to the high frequency oscillations, and tuning the material and insects to respond reactively to the impressed high frequency oscillations.

5. In apparatus for destroying insects in insect infested material by means of high frequency electrical oscillations, an oscillation generator for producing high frequency electrical oscillations and including electrodes defining a space discharge field, a container for the material to be treated located in said field, tuning means for tuning the container and its contents to respond to the impressed frequency furnished by the generator, and means for supplying the material to be treated to said container.

6. In apparatus for destroying insects in insect infested material, a short wave generator including electrodes defining a space discharge field, a container for the material to be treated located in said field, tuning means for tuning the container and its contents to respond to the impressed frequency furnished by the generator, and means for supplying the material to be treated by said container.

7. In apparatus for destroying insects in insect infested material, an ultra-short-wave generator including electrodes defining a space discharge field, a container for the material to be treated located in said field, tuning means, for tuning the container and its contents to respond to the impressed frequency furnished by the generator, and means for supplying the material to be treated to said container.

8. In apparatus for destroying insects in insect infested material, an oscillation generator for producing short wave high frequency oscillations having a wave length of 30 meters or less, said generator including spaced electrodes defining a high frequency field in which the material to be treated is to be disposed in spaced relation to the electrodes, a shield in the field between the material and electrodes comprising a material having a high heating reaction to the high frequency oscillations, tuning means for tuning the material in the field to respond reactively to the frequency of the impressed high frequency oscillations, and means for supplying the material to be treated to the field.

9. In apparatus for destroying insects in insect infested material, a high frequency oscillation generator for producing ultra short wave oscillations having a wave length of 10 meters or less, said generator including spaced electrodes forming a high frequency field, a shield in the field between the material and electrodes comprising a material having a high heating reaction to the high frequency oscillations, tuning means connected across said electrodes for tuning the material in the field to respond reactively to the frequency of the impressed high frequency oscillations, and means for supplying the material to be treated to the field.

10. In apparatus for destroying insects in insect infested material, a high frequency oscillation generator for producing oscillations of a frequency destructive to insect life, said generator including spaced electrodes forming a high frequency field, a gravity conductor of electric insulating material having a high heating reaction to high frequency oscillations for conducting the material to be treated through the field, and means governing the feed of the material through said gravity conductor.

11. In apparatus for destroying insects in insect infested material, a high frequency oscillation generator for producing oscillations of a frequency destructive to insect life, said generator including spaced electrodes forming a high frequency field, a glass conductor disposed between the electrodes for conducting the material to be treated through the field, and tuning means across the field for tuning the material and insects in the field reactively to the frequency of the impressed high frequency oscillations.

12. In apparatus for destroying insects in insect infested material, a short wave high frequency oscillation generator including an output coil, spaced electrodes defining a high frequency field and a transmission line between the coil and electrodes, a container for the material to be treated disposed in the field between the electrodes and in spaced relation thereto, tuning means associated with said electrodes for tuning the material in the field to respond reactively to the frequency of the impressed high frequency oscillations, and a container for holding the material to be treated in said field and in spaced relation to the electrodes.

13. In apparatus for destroying insects in insect infested material, a short wave high frequency oscillation generator including an output coil, spaced electrodes defining a high frequency field, a container for the material to be treated disposed in the field between the electrodes and in spaced relation thereto, an adjustable tuning device across the electrodes for tuning the material in the field to respond reactively to the frequency of the impressed high frequency oscillations, and a transmission line between said coil and tuning device.

14. In an apparatus for destroying insects in insect infested material, a high frequency oscillation generator, an exterminator formed of inner and outer spaced concentric electrodes defining an annular high frequency field space to receive the material to be treated, an output connection between the generator and exterminator, and a tuner in the output connection for tuning the material in the field to respond reactively to the action of the impressed high frequency oscillations.

15. In an apparatus for destroying insects in insect infested material, a high frequency oscillation generator, an exterminator formed of an outer cylindrical metal electrode and an inner electrode, said electrodes being concentrically arranged and defining an annular high frequency field space to receive the material to be treated, an output connection between the generator and exterminator, and a tuner in the output connection for tuning the material in the field to respond reactively to the action of the impressed high frequency oscillations.

16. In an apparatus for destroying insects in insect infested material, a high frequency oscillation generator, an exterminator formed of an outer cylindrical metal electrode and an inner glass coated metal electrode, said electrodes being concentrically arranged and defining an annular high frequency field space to receive the material to be treated, an output connection between the generator and exterminator, and a tuner in the output connection for tuning the material in the field to respond reactively to the action of the impressed high frequency oscillations.

17. In an apparatus for destroying insects in insect infested material, a high frequency oscillation generator, an exterminator formed of inner and outer spaced concentric electrodes defining an annular high frequency field space to receive the material to be treated, an output connection between the generator and the inner electrode of the exterminator, and a tuner in the output connection for tuning the material in the field to respond reactively to the action of the impressed high frequency oscillations.

18. In an apparatus for destroying insects in insect infested material, a high frequency oscillation generator, an exterminator formed of inner and outer spaced concentric electrodes defining an annular high frequency field space to receive the material to be treated, an output connection between the generator and the inner electrode of the exterminator, and a tuner in said connection for tuning the material in the field to respond reactively to the action of the impressed high frequency oscillations.

19. In an apparatus for destroying insects in insect infested material, a high frequency oscillation generator, an exterminator formed of inner and outer spaced concentric electrodes defining an annular high frequency field space to receive the material to be treated, an output coil connected to the generator, a coupling coil connected to the inner electrode of the exterminator, a line connection between said coils, and a tuner in the line connection across said coils.

20. In an apparatus for destroying insects in insect infested material, a short wave high frequency oscillation generator embodying a duplex vacuum tube oscillator having its grid elements provided with output terminals, spaced electrodes defining a high frequency field to receive the material to be treated, a load coil connected to said output terminals, an adjustable tuning element connected across the electrodes for tuning the material in the field to respond reactively to the frequency of the impressed high frequency oscillations, a transmission line between said load coil and tuning element, and means for generating and subjecting the material to be treated to the action of high frequency oscillations in said field.

21. In an apparatus for destroying insects in insect infested material, a high frequency oscillation generator, an exterminator formed of spaced electrodes defining a high frequency field space to receive the material to be treated, an output connection between the generator and exterminator, and a tuner in the output connection for tuning the material in the field to respond reactively to the action of the impressed high frequency oscillations.

22. In an apparatus for destroying insects in insect infested material, a high frequency oscillation generator, an exterminator formed of metal electrodes defining a high frequency field space to receive the material to be treated, an output connection between the generator and exterminator, and a tuner in the output connection for tuning the material in the field to respond reactively to the action of the impressed high frequency oscillations.

23. In an apparatus for destroying insects in insect infested material, a high frequency oscillation generator, an exterminator formed of glass coated metal electrodes defining a high frequency field space to receive the material to be treated, an output connection between the generator and exterminator, and a tuner in the output connection for tuning the material in the field to respond reactively to the action of the impressed high frequency oscillations.

24. In an apparatus for destroying insects in insect infested material, a short wave high frequency oscillation generator, an exterminator formed of spaced inner and outer concentric electrodes defining a high frequency field space to receive the material to be treated, an output connection between the generator and the inner electrode of the exterminator, and a tuner in the output connection for tuning the material in the field to respond reactively to the action of the impressed high frequency oscillations.

25. In an apparatus for destroying insects in insect infested material, an ultra-short wave high frequency oscillation generator, an exterminator formed of spaced electrodes defining a high frequency field space to receive the material to be treated, an output connection between the generator and one of the electrodes of the exterminator, and a tuner in said connection.

26. In an apparatus for destroying insects in insect infested material, a high frequency oscillation generator, an exterminator formed of spaced inner and outer concentric electrodes defining a high frequency field space to receive the material to be treated, an output coil connected to the generator, a coupling coil connected to the inner electrode of the exterminator, a line connection between said coils, and a tuner connected across the coils.

27. In an apparatus for destroying insects in insect infested material, spaced electrodes forming an electrostatic field, an electron valve high frequency oscillation generator circuit including the electrodes, a holder for the material disposed in said field, means in said circuit for balancing the impedance of the circuit to the capacity of the field load, and means for adjusting the electrodes to vary the intensity of the field.

28. In an apparatus for destroying insects in insect infested material, spaced electrodes forming an electrostatic field, an electron valve high frequency oscillation generator circuit including the electrodes, a holder for the material disposed in said field made of an electrode insulating heat-absorbing material, means in said circuit for balancing the impedance of the circuit to the capacity of the field load, and means for adjusting the electrodes to vary the intensity of the field.

JESSE H. DAVIS.